Patented Feb. 12, 1952

2,585,182

UNITED STATES PATENT OFFICE 2,585,182

GREASE LUBRICANT

Samuel Sterman, Buffalo, N. Y., assignor, by mesne assignments, to Union Carbide and Carbon Corporation, a corporation of New York No Drawing. Application March 18, 1947,
Serial No. 735,556

6 Claims. (Cl. 252—41)

The invention relates to lubricating grease compositions, in which the basic lubricant component comprises a synthetically produced organic chemical, rather than a derivative of naturally occurring petroleum oils.

Greases most satisfactory in lubricant service are those showing a low evaporation loss at intended operating temperatures, coupled with sufficient fluidity under stress at the lowest temperatures to which they may be subjected to permit suitable bearing movement; and a stable grease structure must be retained over a quite widely varying temperature range. A correlation of the first two of these properties determines, in fact, the over-all temperature conditions under which satisfactory operation can be expected for any given grease composition. To meet these requirements, it has been customary, and necessary, in the compounding of greases from a mineral oil base, to modify substantially the grease formula constituents in accordance with the temperature variations to be expected in the service for which the grease is intended, and such greases are commonly made in three general grades, which are referred to as low temperature, intermediate temperature, or high temperature types. Even with this expediency considerable difficulty still exists in the formulating of mineral oil greases which are entirely dependable in those physical and chemical properties desirable for reliable lubrication over variable service conditions.

It is an object of this invention to provide improved grease compositions, which, as produced from a synthetic chemical base, are more uniform and consistent in the characteristics essential to good lubrication under a variety of service conditions. A further object is to provide greases which will effectively lubricate over wider temperature ranges, whereby the over-all lubricant service of a single grease composition is substantially enhanced.

I have found that dihexoate and dioctoate esters of certain polyglycols, in particular the di-2-ethylbutyrates and di-2-ethylhexoates of triethylene and tetraethylene glycol, are effective lubricant bases for the compounding of grease compositions. These products, which are now synthetically made commercially, have low volatility, coupled with excellent low temperature viscosity characteristics, and they can be gelled with suitable thickening agents to provide stable grease compositions of unusual versatility in lubricant service. For example, a metal soap grease can be made from these polyglycol esters which is capable of satisfactory lubrication at temperatures varying from as low as minus 95° F., to at least as high as 250° F., whereas the common mineral oil greases must be compounded in two or more separate, and different, formulations to meet similar requirements in lubricant service.

As suitable gelling or thickening agents for the new greases, many compounds heretofore used in this capacity with petroleum base greases are suitable, including such as metal soaps, aliphatic polyamine soaps, vegetable and synthetic waxes, and polyolefine resins. Ricinoleates, stearates, hydroxystearates and naphthenates of alkali and alkaline earth metals will provide a satisfactory gelling action, and greases thickened with lithium hydroxystearate have given particularly desirable lubricant results. From about 5% to 25% by weight of the thickening agent will usually be sufficient to provide a satisfactory grease structure, but depending upon the service intended for the lubricant, the thickener may be increased to as high as 50%, especially where a harder grease consistency may be desired. Minor amounts of an anti-oxidant additive may also be incorporated, when this is considered necessary, and for lubrication at the more elevated temperatures, additions of from about 2% to 5% by weight of an anti-oxidant, such as phenyl alpha naphthylamine, dianisidine, or polymerized trimethyl dihydroquinoline, may be found desirable.

Further emphasizing particularly valuable properties of the polyethylene glycol diester greases, comparison tests with known petroleum greases of the better grade have shown that the new compositions are entirely equivalent in stability, as determined by accepted bleeding and evaporation tests at 100° F., to those petroleum base greases formulated for service at intermediate temperature ranges. At the same time the new greases are useful lubricants at temperatures much below those at which the old greases, of otherwise equal properties, solidify to a point of complete inoperativeness. The latter advantages have been proven by low temperature bearing torque tests, in which a ball bearing packed with the grease is chilled to progressively lower temperatures, and with a measured applied torque, the time for one revolution is determined. These factors provide a plasticity number which is the product of the torque in gram centimeters and the time in seconds for one revolution. Greases made from a base of the di-2-ethyl-hexoates of triethylene and tetraethylene glycol, employing a thickener of about 10% by weight of lithium hydroxystearate, have plasticity numbers indicative of useful service at temperatures as low as minus 65° F. with the lower glycol base, or minus 95° F. with the higher glycol derivative; whereas a comparative petroleum grease has a specified low temperature operativeness no lower than about minus 40° F.

Superiority in the new greases has likewise been shown at elevated temperatures by means of high temperature bearing stability tests. In this procedure, a bearing packed with the grease is operated at 3800 R. P. M. under 100 pounds load, and the time until bearing failure occurs indicates the general usefulness of the product under service at higher temperatures. Greases of this invention, of the formula just mentioned, have, for example, been operative in this test for 150 hours at 300° F., and 800 hours at 250° F., whereas two petroleum greases, of specified low temperature characteristics, failed respectively in 37 hours and 150 hours, under the 250° F. temperature test conditions. Grease formulae similar to the above, but using the glycol di-2-ethylbutyrate esters as the base lubricant, have, in this same test procedure, produced correspondingly comparative results with commercial petroleum greases.

As indicated previously the di-2-ethylbutyrates and di-2-ethylhexoates of triethylene and tetraethylene glycol can be, and are, synthetically made to provide products of predetermined, and closely standardized, physical and chemical properties, and this in turn permits the compounding of greases, with these esters as the base lubricant, which more reliably will meet the service for which they are intended. Diesters of comparatively high purity will make the best greases, and for lubrication over wide temperature ranges, care should be taken to avoid any appreciable amounts of low boiling diluents, which may be found in the more crude ester products, but which can be readily removed by further refinement. Aside from the base lubricant compositions many modifications in the grease formulae possible within this disclosure will be apparent, and the use of a wide variety of gelling agents, or of additives for anti-oxidant or other purposes are intended to be included within the broader scope of the invention.

I claim:

1. A lubricating grease composition comprising a base lubricant of a member of the group consisting of di-2-ethylbutyrate and di-2-ethylhexoate esters of triethylene and tetraethylene glycols, and a metal soap thickening agent blended therewith in an amount of about 5% to 50% by weight.

2. A lubricating grease composition comprising a base lubricant of a member of the group consisting of di-2-ethylbutyrate and di-2-ethylhexoate esters of triethylene and tetraethylene glycols, and an alkali metal soap thickening agent blended therewith in amount of about 5% to 25% by weight.

3. A lubricating grease composition comprising a base lubricant of a di-2-ethylhexoate ester of a glycol of the group consisting of triethylene and tetraethylene glycols, and about 5% to 25% by weight of a thickening agent blended therewith consisting of lithium hydroxystearate.

4. A lubricating grease composition comprising a base lubricant of a di-2-ethylbutyrate ester of a glycol of the group consisting of triethylene and tetraethylene glycols, and about 5% to 25% by weight of a thickening agent blended therewith consisting of lithium hydroxystearate.

5. A lubricating grease composition comprising triethylene glycol di-2-ethylhexoate as a base lubricant, a thickening agent of lithium hydroxystearate in amount of about 5% to 25% by weight, and an anti-oxidant of a member of the group consisting of phenyl alpha naphthylamine and polymeric trimethyl dihydroquinoline, in amount of about 2% to 5% by weight.

6. A lubricating grease composition comprising tetraethylene glycol di-2-ethylhexoate as a base lubricant, a thickening agent of lithium hydroxystearate in amount of about 5% to 25% by weight, and an anti-oxidant of a member of the group consisting of phenyl alpha naphthylamine and polymeric trimethyl dihydroquinoline, in amount of about 2% to 5% by weight.

SAMUEL STERMAN.

REFERENCES CITED

The following references are of record in the file of this patent:

UNITED STATES PATENTS

| Number | Name | Date |
|---|---|---|
| 2,108,644 | Brunstrum | Feb. 15, 1938 |
| 2,210,140 | Colbeth | Aug. 6, 1940 |
| 2,289,748 | Beerbower | July 14, 1942 |
| 2,383,917 | Morgan | Aug. 28, 1945 |
| 2,397,956 | Fraser | Apr. 9, 1946 |
| 2,423,844 | Morgan | July 15, 1947 |
| 2,436,347 | Zimmer et al. | Feb. 17, 1948 |
| 2,448,567 | Zimmer et al. | Sept. 7, 1948 |